United States Patent
Ben-Moshe et al.

(10) Patent No.: US 11,252,027 B2
(45) Date of Patent: Feb. 15, 2022

(54) NETWORK ELEMENT SUPPORTING FLEXIBLE DATA REDUCTION OPERATIONS

(71) Applicant: MELLANOX TECHNOLOGIES TLV LTD., Raanana (IL)

(72) Inventors: Ortal Ben-Moshe, Givat Shmuel (IL); Lion Levi, Yavne (IL); Itamar Rabenstein, Petah-Tikva (IL); Idan Matari, Lod (IL); Noam Michaelis, Tel Aviv (IL); Ofir Merdler, Tel Aviv (IL); Evyatar Romlet, Raanana (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 67 days.

(21) Appl. No.: 16/750,019

(22) Filed: Jan. 23, 2020

(65) Prior Publication Data
US 2021/0234753 A1 Jul. 29, 2021

(51) Int. Cl.
*H04L 12/24* (2006.01)
*H04L 12/911* (2013.01)
*H04L 1/00* (2006.01)
*H04L 29/08* (2006.01)

(52) U.S. Cl.
CPC ........ *H04L 41/0806* (2013.01); *H04L 1/0028* (2013.01); *H04L 41/12* (2013.01); *H04L 47/82* (2013.01); *H04L 69/324* (2013.01)

(58) Field of Classification Search
CPC combination set(s) only.
See application file for complete search history.

(56) References Cited

U.S. PATENT DOCUMENTS

| | | |
|---|---|---|
| 4,933,969 A | 6/1990 | Marshall et al. |
| 5,068,877 A | 11/1991 | Near et al. |
| 5,325,500 A | 6/1994 | Bell et al. |

(Continued)

OTHER PUBLICATIONS

Chapman et al., "Introducing OpenSHMEM: SHMEM for the PGAS Community," Proceedings of the Forth Conferene on Partitioned Global Address Space Programming Model, pp. 1-4, Oct. 2010.

(Continued)

*Primary Examiner* — Yee F Lam
(74) *Attorney, Agent, or Firm* — Kligler & Associates Patent Attorneys Ltd (57) ABSTRACT

A network element includes a plurality of ports, multiple computational modules, configurable forwarding circuitry and a central block. The ports include child ports coupled to child network elements or network nodes and parent ports coupled to parent network elements. The computational modules collectively perform a data reduction operation of a data reduction protocol. The forwarding circuitry interconnects among ports and computational modules. The central block receives a request indicative of child ports, a parent port, and computational modules required for performing reduction operations on data received via the child ports, for producing reduced data destined to the parent port, to derive from the request a topology that interconnects among the child ports, parent port and computational modules for performing the data reduction operations and to forward the reduced data for transmission to the selected parent port, and to configure the forwarding circuitry to apply the topology.

18 Claims, 6 Drawing Sheets

(56) References Cited

U.S. PATENT DOCUMENTS

| | | | |
|---|---|---|---|
| 5,353,412 A | 10/1994 | Douglas et al. | |
| 5,404,565 A | 4/1995 | Gould et al. | |
| 5,606,703 A | 2/1997 | Brady et al. | |
| 5,944,779 A | 8/1999 | Blum | |
| 6,041,049 A | 3/2000 | Brady | |
| 6,370,502 B1 | 4/2002 | Wu et al. | |
| 6,483,804 B1 | 11/2002 | Muller et al. | |
| 6,507,562 B1 | 1/2003 | Kadansky et al. | |
| 6,728,862 B1 | 4/2004 | Wilson | |
| 6,857,004 B1 | 2/2005 | Howard et al. | |
| 6,937,576 B1 | 8/2005 | Di Benedetto et al. | |
| 7,102,998 B1 | 9/2006 | Golestani | |
| 7,124,180 B1 | 10/2006 | Ranous | |
| 7,164,422 B1 | 1/2007 | Wholey, III et al. | |
| 7,171,484 B1 | 1/2007 | Krause et al. | |
| 7,313,582 B2 | 12/2007 | Bhanot et al. | |
| 7,327,693 B1 | 2/2008 | Rivers et al. | |
| 7,336,646 B2 | 2/2008 | Muller | |
| 7,346,698 B2 | 3/2008 | Hannaway | |
| 7,555,549 B1 | 6/2009 | Campbell et al. | |
| 7,613,774 B1 | 11/2009 | Caronni et al. | |
| 7,636,424 B1* | 12/2009 | Halikhedkar | H04Q 3/0075 |
| | | | 379/15.01 |
| 7,636,699 B2 | 12/2009 | Stanfill | |
| 7,738,443 B2 | 6/2010 | Kumar | |
| 8,213,315 B2 | 7/2012 | Crupnicoff et al. | |
| 8,380,880 B2 | 2/2013 | Gulley et al. | |
| 8,510,366 B1 | 8/2013 | Anderson et al. | |
| 8,738,891 B1 | 5/2014 | Karandikar et al. | |
| 8,761,189 B2 | 6/2014 | Shachar et al. | |
| 8,768,898 B1 | 7/2014 | Trimmer et al. | |
| 8,775,698 B2 | 7/2014 | Archer et al. | |
| 8,811,417 B2 | 8/2014 | Bloch et al. | |
| 9,110,860 B2 | 8/2015 | Shahar | |
| 9,189,447 B2 | 11/2015 | Faraj | |
| 9,294,551 B1 | 3/2016 | Froese et al. | |
| 9,344,490 B2 | 5/2016 | Bloch et al. | |
| 9,563,426 B1 | 2/2017 | Bent et al. | |
| 9,626,329 B2 | 4/2017 | Howard | |
| 9,756,154 B1 | 9/2017 | Jiang | |
| 10,015,106 B1 | 7/2018 | Florissi et al. | |
| 10,158,702 B2 | 12/2018 | Bloch et al. | |
| 10,284,383 B2 | 5/2019 | Bloch et al. | |
| 10,296,351 B1 | 5/2019 | Kohn et al. | |
| 10,305,980 B1 | 5/2019 | Gonzalez et al. | |
| 10,318,306 B1 | 6/2019 | Kohn et al. | |
| 10,425,350 B1 | 9/2019 | Florissi | |
| 10,521,283 B2 | 12/2019 | Shuler et al. | |
| 10,541,938 B1 | 1/2020 | Timmerman et al. | |
| 10,621,489 B2 | 4/2020 | Appuswamy et al. | |
| 2002/0010844 A1 | 1/2002 | Noel et al. | |
| 2002/0035625 A1 | 3/2002 | Tanaka | |
| 2002/0150094 A1 | 10/2002 | Cheng et al. | |
| 2002/0150106 A1 | 10/2002 | Kagan et al. | |
| 2002/0152315 A1 | 10/2002 | Kagan et al. | |
| 2002/0152327 A1 | 10/2002 | Kagan et al. | |
| 2002/0152328 A1 | 10/2002 | Kagan et al. | |
| 2003/0018828 A1 | 1/2003 | Craddock et al. | |
| 2003/0061417 A1 | 3/2003 | Craddock et al. | |
| 2003/0065856 A1 | 4/2003 | Kagan et al. | |
| 2004/0062258 A1 | 4/2004 | Grow et al. | |
| 2004/0078493 A1* | 4/2004 | Blumrich | G06F 9/52 |
| | | | 709/250 |
| 2004/0120331 A1 | 6/2004 | Rhine et al. | |
| 2004/0123071 A1 | 6/2004 | Stefan et al. | |
| 2004/0252685 A1 | 12/2004 | Kagan et al. | |
| 2004/0260683 A1 | 12/2004 | Chan et al. | |
| 2005/0097300 A1 | 5/2005 | Gildea et al. | |
| 2005/0122329 A1 | 6/2005 | Janus | |
| 2005/0129039 A1 | 6/2005 | Biran et al. | |
| 2005/0131865 A1 | 6/2005 | Jones et al. | |
| 2005/0281287 A1 | 12/2005 | Ninomi et al. | |
| 2006/0282838 A1 | 12/2006 | Gupta et al. | |
| 2007/0127396 A1* | 6/2007 | Jain | H04L 12/56 |
| | | | 370/254 |
| 2007/0162236 A1 | 7/2007 | Lamblin et al. | |
| 2008/0104218 A1* | 5/2008 | Liang | H04L 41/0677 |
| | | | 709/223 |
| 2008/0126564 A1 | 5/2008 | Wilkinson | |
| 2008/0168471 A1 | 7/2008 | Benner et al. | |
| 2008/0181260 A1 | 7/2008 | Vonog et al. | |
| 2008/0192750 A1* | 8/2008 | Ko | H04L 63/1466 |
| | | | 370/395.3 |
| 2008/0244220 A1 | 10/2008 | Lin et al. | |
| 2008/0263329 A1 | 10/2008 | Archer et al. | |
| 2008/0288949 A1 | 11/2008 | Bohra et al. | |
| 2008/0298380 A1 | 12/2008 | Rittmeyer et al. | |
| 2008/0307082 A1* | 12/2008 | Cai | G06F 15/17337 |
| | | | 709/223 |
| 2009/0037377 A1 | 2/2009 | Archer et al. | |
| 2009/0063816 A1 | 3/2009 | Arimilli et al. | |
| 2009/0063817 A1 | 3/2009 | Arimilli et al. | |
| 2009/0063891 A1 | 3/2009 | Arimilli et al. | |
| 2009/0182814 A1 | 7/2009 | Tapolcai et al. | |
| 2009/0247241 A1 | 10/2009 | Gollnick et al. | |
| 2009/0292905 A1 | 11/2009 | Faraj | |
| 2010/0017420 A1 | 1/2010 | Archer et al. | |
| 2010/0049836 A1 | 2/2010 | Kramer | |
| 2010/0074098 A1 | 3/2010 | Zeng et al. | |
| 2010/0095086 A1 | 4/2010 | Eichenberger et al. | |
| 2010/0185719 A1 | 7/2010 | Howard | |
| 2010/0241828 A1 | 9/2010 | Yu et al. | |
| 2011/0060891 A1 | 3/2011 | Jia | |
| 2011/0066649 A1 | 3/2011 | Berlyant et al. | |
| 2011/0119673 A1 | 5/2011 | Bloch et al. | |
| 2011/0173413 A1 | 7/2011 | Chen et al. | |
| 2011/0219208 A1 | 9/2011 | Asaad | |
| 2011/0238956 A1 | 9/2011 | Arimilli et al. | |
| 2011/0258245 A1 | 10/2011 | Blocksome et al. | |
| 2011/0276789 A1 | 11/2011 | Chambers et al. | |
| 2012/0063436 A1 | 3/2012 | Thubert et al. | |
| 2012/0117331 A1 | 5/2012 | Krause et al. | |
| 2012/0131309 A1 | 5/2012 | Johnson | |
| 2012/0216021 A1 | 8/2012 | Archer et al. | |
| 2012/0254110 A1* | 10/2012 | Takemoto | G06F 16/184 |
| | | | 707/624 |
| 2013/0117548 A1 | 5/2013 | Grover et al. | |
| 2013/0159410 A1 | 6/2013 | Lee et al. | |
| 2013/0318525 A1 | 11/2013 | Palanisamy et al. | |
| 2013/0336292 A1 | 12/2013 | Kore et al. | |
| 2014/0033217 A1 | 1/2014 | Vajda et al. | |
| 2014/0047341 A1 | 2/2014 | Breternitz et al. | |
| 2014/0095779 A1 | 4/2014 | Forsyth et al. | |
| 2014/0122831 A1 | 5/2014 | Uliel et al. | |
| 2014/0189308 A1 | 7/2014 | Hughes et al. | |
| 2014/0211804 A1 | 7/2014 | Makikeni et al. | |
| 2014/0280420 A1 | 9/2014 | Khan | |
| 2014/0281370 A1 | 9/2014 | Khan | |
| 2014/0362692 A1 | 12/2014 | Wu et al. | |
| 2014/0365548 A1 | 12/2014 | Mortensen | |
| 2015/0106578 A1 | 4/2015 | Warfield et al. | |
| 2015/0143076 A1 | 5/2015 | Khan | |
| 2015/0143077 A1 | 5/2015 | Khan | |
| 2015/0143078 A1 | 5/2015 | Khan et al. | |
| 2015/0143079 A1 | 5/2015 | Khan | |
| 2015/0143085 A1 | 5/2015 | Khan | |
| 2015/0143086 A1 | 5/2015 | Khan | |
| 2015/0154058 A1 | 6/2015 | Miwa et al. | |
| 2015/0180785 A1 | 6/2015 | Annamraju | |
| 2015/0188987 A1 | 7/2015 | Reed et al. | |
| 2015/0193271 A1 | 7/2015 | Archer et al. | |
| 2015/0212972 A1 | 7/2015 | Boettcher et al. | |
| 2015/0269116 A1 | 9/2015 | Raikin et al. | |
| 2015/0379022 A1 | 12/2015 | Puig et al. | |
| 2016/0055225 A1 | 2/2016 | Xu et al. | |
| 2016/0105494 A1 | 4/2016 | Reed et al. | |
| 2016/0112531 A1 | 4/2016 | Milton et al. | |
| 2016/0117277 A1 | 4/2016 | Raindel et al. | |
| 2016/0179537 A1 | 6/2016 | Kunzman et al. | |
| 2016/0219009 A1* | 7/2016 | French | H04L 51/14 |
| 2016/0248656 A1 | 8/2016 | Anand et al. | |
| 2016/0299872 A1 | 10/2016 | Vaidyanathan et al. | |
| 2016/0342568 A1 | 11/2016 | Burchard et al. | |
| 2016/0364350 A1 | 12/2016 | Sanghi et al. | |

(56) References Cited

U.S. PATENT DOCUMENTS

| | | |
|---|---|---|
| 2017/0063613 A1 | 3/2017 | Bloch et al. |
| 2017/0093715 A1 | 3/2017 | McGhee et al. |
| 2017/0116154 A1 | 4/2017 | Palmer et al. |
| 2017/0187496 A1 | 6/2017 | Shalev et al. |
| 2017/0187589 A1 | 6/2017 | Pope et al. |
| 2017/0187629 A1 | 6/2017 | Shalev et al. |
| 2017/0187846 A1 | 6/2017 | Shalev et al. |
| 2017/0199844 A1 | 7/2017 | Burchard et al. |
| 2018/0004530 A1 | 1/2018 | Vorbach |
| 2018/0046901 A1 | 2/2018 | Xie et al. |
| 2018/0047099 A1 | 2/2018 | Bonig et al. |
| 2018/0089278 A1 | 3/2018 | Bhattacharjee et al. |
| 2018/0091442 A1 | 3/2018 | Chen et al. |
| 2018/0097721 A1* | 4/2018 | Matsui .................. H04L 45/28 |
| 2018/0173673 A1 | 6/2018 | Daglis et al. |
| 2018/0262551 A1 | 9/2018 | Demeyer et al. |
| 2018/0285316 A1 | 10/2018 | Thorson et al. |
| 2018/0287928 A1 | 10/2018 | Levi et al. |
| 2018/0302324 A1* | 10/2018 | Kasuya ................ H04L 45/745 |
| 2018/0321912 A1* | 11/2018 | Li ............................ G06F 7/50 |
| 2018/0321938 A1 | 11/2018 | Boswell et al. |
| 2018/0367465 A1 | 12/2018 | Levi |
| 2018/0375781 A1 | 12/2018 | Chen et al. |
| 2019/0018805 A1 | 1/2019 | Benisty |
| 2019/0026250 A1 | 1/2019 | Das Sarma et al. |
| 2019/0065208 A1 | 2/2019 | Liu et al. |
| 2019/0068501 A1 | 2/2019 | Schneider et al. |
| 2019/0102179 A1 | 4/2019 | Fleming et al. |
| 2019/0102338 A1 | 4/2019 | Tang et al. |
| 2019/0102640 A1 | 4/2019 | Balasubramanian |
| 2019/0114533 A1 | 4/2019 | Ng et al. |
| 2019/0121388 A1 | 4/2019 | Knowles et al. |
| 2019/0138638 A1 | 5/2019 | Pal et al. |
| 2019/0147092 A1 | 5/2019 | Pal et al. |
| 2019/0235866 A1 | 8/2019 | Das Sarma et al. |
| 2019/0303168 A1 | 10/2019 | Fleming, Jr. et al. |
| 2019/0303263 A1 | 10/2019 | Fleming, Jr. et al. |
| 2019/0324431 A1 | 10/2019 | Celia et al. |
| 2019/0339688 A1 | 11/2019 | Cella et al. |
| 2019/0347099 A1 | 11/2019 | Eapen et al. |
| 2019/0369994 A1 | 12/2019 | Parandeh Afshar et al. |
| 2019/0377580 A1 | 12/2019 | Vorbach |
| 2019/0379714 A1 | 12/2019 | Levi et al. |
| 2020/0005859 A1 | 1/2020 | Chen et al. |
| 2020/0034145 A1 | 1/2020 | Bainville et al. |
| 2020/0057748 A1 | 2/2020 | Danilak |
| 2020/0103894 A1 | 4/2020 | Celia et al. |
| 2020/0106828 A1 | 4/2020 | Elias et al. |
| 2020/0137013 A1 | 4/2020 | Jin et al. |

OTHER PUBLICATIONS

Priest et al., "You've Got Mail (YGM): Building Missing Asynchronous Communication Primitives", IEEE International Parallel and Distributed Processing Symposium Workshops, pp. 221-230, year 2019.

Wikipedia, "Nagle's algorithm", pp. 1-4, Dec. 12, 2019.

Mellanox Technologies, "InfiniScale IV: 36-port 40GB/s Infiniband Switch Device", pp. 1-2, year 2009.

Mellanox Technologies Inc., "Scaling 10Gb/s Clustering at Wire-Speed", pp. 1-8, year 2006.

IEEE 802.1D Standard "IEEE Standard for Local and Metropolitan Area Networks—Media Access Control (MAC) Bridges", IEEE Computer Society, pp. 1-281, Jun. 9, 2004.

IEEE 802.1AX Standard "IEEE Standard for Local and Metropolitan Area Networks—Link Aggregation", IEEE Computer Society, pp. 1-163, Nov. 3, 2008.

Turner et al., "Multirate Clos Networks", IEEE Communications Magazine, pp. 1-11, Oct. 2003.

Thayer School of Engineering, "An Slightly Edited Local Copy of Elements of Lectures 4 and 5", Dartmouth College, pp. 1-5, Jan. 15, 1998 http://people.seas.harvard.edu/~jones/cscie129/nu_lectures/lecture11/switching/clos_network/clos_network.html.

"MPI: A Message-Passing Interface Standard," Message Passing Interface Forum, version 3.1, pp. 1-868, Jun. 4, 2015.

Coti et al., "MPI Applications on Grids: a Topology Aware Approach," Proceedings of the 15th International European Conference on Parallel and Distributed Computing (EuroPar'09), pp. 1-12, Aug. 2009.

Petrini et al., "The Quadrics Network (QsNet): High-Performance Clustering Technology," Proceedings of the 9th IEEE Symposium on Hot Interconnects (Hotl'01), pp. 1-6, Aug. 2001.

Sancho et al., "Efficient Offloading of Collective Communications in Large-Scale Systems," Proceedings of the 2007 IEEE International Conference on Cluster Computing, pp. 1-10, Sep. 17-20, 2007.

Infiniband Trade Association, "InfiniBand™ Architecture Specification", release 1.2.1, pp. 1-1727, Jan. 2008.

InfiniBand Architecture Specification, vol. 1, Release 1.2.1, pp. 1-1727, Nov. 2007.

Deming, "Infiniband Architectural Overview", Storage Developer Conference, pp. 1-70, year 2013.

Fugger et al., "Reconciling fault-tolerant distributed computing and systems-on-chip", Distributed Computing, vol. 24, Issue 6, pp. 323-355, Jan. 2012.

Wikipedia, "System on a chip", pp. 1-4, Jul. 6, 2018.

Villavieja et al., "On-chip Distributed Shared Memory", Computer Architecture Department, pp. 1-10, Feb. 3, 2011.

U.S. Appl. No. 16/357,356 office action dated May 14, 2020.

European Application # 20156490.3 search report dated Jun. 25, 2020.

Bruck et al., "Efficient Algorithms for All-to-All Communications in Multiport Message-Passing Systems", IEEE Transactions on Parallel and Distributed Systems, vol. 8, No. 11, pp. 1143-1156, Nov. 1997.

Bruck et al., "Efficient Algorithms for All-to-All Communications in Multiport Message-Passing Systems", Proceedings of the sixth annual ACM symposium on Parallel algorithms and architectures, pp. 298-309, Aug. 1, 1994.

Chiang et al., "Toward supporting data parallel programming on clusters of symmetric multiprocessors", Proceedings International Conference on Parallel and Distributed Systems, pp. 607-614, Dec. 14, 1998.

Gainaru et al., "Using InfiniBand Hardware Gather-Scatter Capabilities to Optimize MPI All-to-All", Proceedings of the 23rd European MPI Users' Group Meeting, pp. 167-179, Sep. 2016.

Pjesivac-Grbovic et al., "Performance Analysis of MPI Collective Operations", 19th IEEE International Parallel and Distributed Processing Symposium, pp. 1-19, 2015.

Danalis et al., "PTG: an abstraction for unhindered parallelism", 2014 Fourth International Workshop on Domain-Specific Languages and High-Level Frameworks for High Performance Computing, pp. 1-10, Nov. 17, 2014.

Cosnard et al., "Symbolic Scheduling of Parameterized Task Graphs on Parallel Machines," Combinatorial Optimization book series (COOP, vol. 7), pp. 217-243, year 2000.

Jeannot et al., "Automatic Multithreaded Parallel Program Generation for Message Passing Multiprocessors using paramerized Task Graphs", World Scientific, pp. 1-8, Jul. 23, 2001.

Stone, "An Efficient Parallel Algorithm for the Solution of a Tridiagonal Linear System of Equations," Journal of the Association for Computing Machinery, vol. 10, No. 1, pp. 27-38, Jan. 1973.

Kogge et al., "A Parallel Algorithm for the Efficient Solution of a General Class of Recurrence Equations," IEEE Transactions on Computers, vol. C-22, No. 8, pp. 786-793, Aug. 1973.

Hoefler et al., "Message Progression in Parallel Computing—To Thread or not to Thread?", 2008 IEEE International Conference on Cluster Computing, pp. 1-10, Tsukuba, Japan, Sep. 29-Oct. 1, 2008.

U.S. Appl. No. 16/430,457 Office Action dated Jul. 9, 2021.

Yang et al., "SwitchAgg: A Further Step Toward In-Network Computing," 2019 IEEE International Conference on Parallel & Distributed Processing with Applications, Big Data & Cloud Computing, Sustainable Computing & Communications, Social Computing & Networking, pp. 36-45, Dec. 2019.

EP Application # 20216972 Search Report dated Jun. 11, 2021.

U.S. Appl. No. 16/782,118 Office Action dated Jun. 3, 2021.

(56) References Cited

OTHER PUBLICATIONS

U.S. Appl. No. 16/789,458 Office Action dated Jun. 10, 2021.
"Message Passing Interface (MPI): History and Evolution," Virtual Workshop, Cornell University Center for Advanced Computing, NY, USA, pp. 1-2, year 2021, as downloaded from https://cvw.cac.cornell.edu/mpi/history.
Pacheco, "A User's Guide to MPI," Department of Mathematics, University of San Francisco, CA, USA, pp. 1-51, Mar. 30, 1998.
Wikipedia, "Message Passing Interface," pp. 1-16, last edited Nov. 7, 2021, as downloaded from https://en.wikipedia.org/wiki/Message_Passing_Interface.
U.S. Appl. No. 16/782,118 Office Action dated Nov. 8, 2021.

\* cited by examiner

NETWORK ELEMENT SUPPORTING FLEXIBLE DATA REDUCTION OPERATIONS

TECHNICAL FIELD

Embodiments described herein relate generally to in-network computing, and particularly to methods and systems for network elements supporting flexible data reduction operations.

BACKGROUND

Some computing systems support performing computation tasks by network elements of a communication system. Methods for distributing a computation among multiple network elements are known in the art. For example, U.S. Pat. No. 10,284,383 describes a switch in a data network, configured to mediate data exchanges among network elements. The apparatus further includes a processor, which organizes the network elements into a hierarchical tree having a root node network element, vertex node network elements, and child node network elements that include leaf node network elements. The leaf node network elements originate aggregation data and transmit the aggregation data to respective parent vertex node network elements. The vertex node network elements combine the aggregation data from at least a portion of the child node network elements, and transmit the combined aggregation data from the vertex node network elements to parent vertex node network elements. The root node network element is operative for initiating a reduction operation on the aggregation data.

SUMMARY

An embodiment that is described herein provides a network element that includes a plurality of ports, multiple computational modules, configurable forwarding circuitry and a central block. The plurality of ports includes multiple child ports coupled to respective child network elements or network nodes and one or more parent ports coupled to respective parent network elements. The plurality of ports being configured to connect to a communication network. The computational modules are configured to collectively perform a data reduction operation in accordance with a data reduction protocol. The configurable forwarding circuitry is configured to interconnect among the ports and the computational modules. The central block is configured to receive a request indicative of selected child ports, a selected parent port, and computational modules required for performing data reduction operations on data received from the child network elements or network nodes via the selected child ports, for producing reduced data destined to a parent network element via the selected parent port, to derive, from the request, a topology that interconnects among the selected child ports, the selected parent port and the computational modules so as to perform the data reduction operations and to forward the respective reduced data for transmission to the selected parent port, and to configure the forwarding circuitry to apply the topology.

In some embodiments, the selected child ports are configured to receive data messages including a reduction operation and respective data portions, and to send the reduction operation to the central block, and the central block is configured to set the computational modules to apply the reduction operation to the data portions. In other embodiments, the central block is configured to derive the topology to interconnect computational modules that receive data for reduction via the selected child ports, in a chain configuration. In yet other embodiments, the central block is configured to derive the topology to interconnect outputs of two computational modules that receive data for reduction via the selected child ports as inputs to an aggregator computational module.

In an embodiment, the selected parent port and each of the selected child ports include a QP responder and a QP requester, configured to respectively handle reliable transport layer reception and transmission of packets. In another embodiment, the central block is configured to receive a first request indicative of first child ports, a first parent port and first computational modules required to perform first data reduction operations on data received via the first child ports and destined to the first parent port, and further receive a second request indicative of second child ports, a second parent port, and second computational modules required to perform second data reduction operations on data received via the second child ports and destined to the second parent port, to derive from the first request a first topology for performing the first data reduction operations and derive from the second request a second topology for performing the second data reduction operations, and to configure the forwarding circuitry to apply both the first topology and the second topology so as to support performing the first data reduction operations and the second data reduction operations in parallel. In yet another embodiment, the request is indicative of the network element serving as a root network element, and the central block is configured to derive from the request a topology that interconnects among the selected child ports and the computational modules so as to perform the data reduction operations for producing aggregated data and to route the aggregated data to one or more child ports.

In some embodiments, the request or a separately received request is indicative of a given parent port and one or more given child ports, and the central block is configured to derive from the request, a topology that interconnects the given parent port to the one or more given child ports for receiving aggregated data from a respective parent network element via the given parent port and distributing the aggregated data via the given child ports to respective network elements or network nodes. In other embodiments, the forwarding circuitry includes upstream forwarding circuitry and downstream forwarding circuitry, and the central block is configured to apply, in parallel, an upstream topology to the upstream forwarding circuitry for applying the data reduction operations, and to apply a downstream topology to the downstream forwarding circuitry for distributing aggregated data produced by a root network element toward one or more network nodes.

There is additionally provided, in accordance with an embodiment that is described herein, a method including, in a network element including (i) a plurality of ports that connect to a communication network, including multiple child ports coupled to respective child network elements or network nodes and one or more parent ports coupled to respective parent network elements, (ii) multiple computational modules that collectively perform a data reduction operation, in accordance with a data reduction protocol, and (iii) configurable forwarding circuitry that interconnects among the ports and the computational modules, receiving by a central block of the network element a request indicative of selected child ports, a selected parent port, and computational modules required for performing data reduction operations on data received via the selected child ports, for producing reduced data destined to a parent network element via the selected parent port. A topology is derived, from the request, that interconnects among the selected child ports, the selected parent port and the computational modules so as to perform data reduction operations, and to forward the reduced data for transmission to the selected parent port. The topology is applied by the forwarding circuitry.

These and other embodiments will be more fully understood from the following detailed description of the embodiments thereof, taken together with the drawings in which:

DETAILED DESCRIPTION OF EMBODIMENTS

Overview

Embodiments that are described herein provide systems and methods for in-network computing using network elements that support flexible data reduction operations.

In-network computing involves dividing a calculation over a stream of data into multiple sub-calculations executed by network elements of a communication network. A network element may comprise any suitable network device such as, for example, a switch or a router.

In some embodiments, an in-network calculation is carried out hierarchically by multiple network elements arranged in a multi-level configuration. Network elements of the lowest level receive portions of the data stream from multiple network nodes and based on the data portions produce partial results. Elements of higher levels further aggregate the partial results up to a root network element that produces a final calculation result. The root network element typically distributes the final calculation result to some or all of the network nodes that provided the data, and/or to other network elements.

A partial result produced by a network element as part of an in-network calculation is also referred to herein as a "reduced data" and the final result produced by the root network element is also referred to herein as an "aggregated data." A logical structure that models the hierarchical in-network calculation is referred to as a "data reduction tree."

In-network calculations are often implemented in accordance with a data reduction protocol. An example data reduction protocol of this sort is the Scalable Hierarchical Aggregation and Reduction Protocol (SHArP™) described in U.S. Pat. No. 10,284,383 cited above. The data reduction protocol typically specifies messages that the network nodes and network elements exchange with one another for delivering data and control. Messages related to the data reduction protocol typically comprise multiple packets, wherein each of the packets comprises a transport layer header and a payload. In some embodiments, the first packet of the message comprises a header of the underlying data reduction protocol, e.g., a SHArP header.

An important requirement in implementing in-network computing is to efficiently carry out multiple complex calculations over multiple respective high-bandwidth data streams in parallel and with low latency. Some aspects of accelerating data reduction operations in hardware are described, for example, in U.S. patent application Ser. No. 16/357,356, of Elias et al., filed Mar. 19, 2019.

In principle, multiple data reduction trees may be used for modeling multiple respective in-network calculations in parallel. Such data reduction trees, however, may use separate sets of ports and computational resources across respective network elements, in which case they can maintain full port bandwidth. Reduction trees that do not share ports are also referred to as "disjoint reduction trees."

In the disclosed embodiments, each network element comprises multiple computational modules for performing data reduction operations in hardware. In some embodiments, each port that receives data for reduction has a respective computational module. The computational modules and ports may be interconnected using configurable forwarding circuitry in various topologies. This allows flexible usage of the computational modules in separate reduction trees without sharing port bandwidth.

Consider a network element, comprising a plurality of ports coupled to network elements and/or network nodes. Ports coupled to respective child network elements or network nodes are referred to as "child ports" and ports coupled to respective parent network elements are referred to as "parent ports." The network element further comprises multiple computational modules, configurable forwarding circuitry and a central block. The ports are configured to connect to a communication network. The multiple computational modules are configured to collectively perform a data reduction operation, in accordance with a data reduction protocol. The forwarding circuitry is configured to interconnect among the ports and the computational modules. The central block is configured to receive a request indicative of selected child ports, a selected parent port, and computational modules required for performing data reduction operations on data received via the selected child ports, for producing reduced data destined to a parent network element via the selected parent port. The central block derives from the request a topology that interconnects among the selected child ports, the selected parent port and the computational modules so as to perform the requested data reduction operations and to forward the reduced data for transmission to the selected parent port, and configures the forwarding circuitry to apply the topology.

In some embodiments, the selected child ports are configured to receive data messages comprising a reduction operation and respective data portions, and to send the reduction operation to the central block. The central block is configured to set the computational modules to apply the reduction operation to the data portions.

The central block may derive the topology in any suitable way. For example, the central block derives a topology that interconnects multiple computational modules that receive data from child ports in a chain configuration, or in an aggregated configuration that aggregates two or more chains. In some embodiments, the network element stores multiple predefined topologies, e.g., in a table in memory. In such embodiments, the central block derives a requested topology by retrieving it from the table.

In some embodiments, each of the parent port and the child ports comprises a QP responder and a QP requester, that handle reliable transport layer communication of packets related to the data reduction protocol. Handling transport layer communication at the port level (and not by a central element such as the central block) allows fast and reliable packet delivery to and from other network elements and network nodes, at full port bandwidth.

In some embodiments, the central block receives a first data reduction request indicative of first child ports, a first parent port and first computational modules required to perform a first data reduction operations on data received via the first child ports and destined to a the first parent port, and further receives a second data reduction request indicative of second child ports, a second parent port, and second computational modules required to perform a second data reduction operations on data received via the second child ports and destined to a the second parent port. The central block derives from the first request a first topology for performing the first data reduction operations and derives from the second request a second topology for performing the second data reduction operations. The central block configures the forwarding circuitry to apply both the first topology and the second topology so as to support performing the first data reduction operations and the second data reduction operations in parallel.

The first and second topologies may use disjoint subsets of ports and computational modules. The central block may configure the forwarding circuitry to apply the derived first and second topologies so that respective data first and second reduction operations are executed at full port bandwidth, and may overlap in time.

In some embodiments, the request is indicative of the network element serving as a root network element, and the central block derives from the request a topology that interconnects among the selected child ports and the computational modules so as to perform data reduction operations for producing aggregated data and to route the aggregated data to one or more child ports.

In an embodiment, the request or a separately received request is indicative of a given parent port and one or more given child ports, and the central block is configured to derive from the request a topology that interconnects the given parent port to the one or more given child ports, for receiving aggregated data from a respective parent network element via the given parent port and distributing the aggregated data via the given child ports to respective network elements or network nodes.

In an embodiment, the forwarding circuitry comprises upstream forwarding circuitry and downstream forwarding circuitry. In this embodiment, the central block applies in parallel an upstream topology to the upstream forwarding circuitry for applying the data reduction operations, and applies a downstream topology to the downstream forwarding circuitry for distributing aggregated data produced by a root network element toward one or more network nodes.

In the disclosed techniques a network element supports flexible interconnections among ports and computational modules, without unnecessarily using computational modules for just passing data, thus refraining from bandwidth sharing. Ports that receive data for reduction have local computational modules that may be interconnected, e.g., in a serial chain having a suitable length, or in an aggregated configuration that aggregates multiple chains. This flexibility in connecting computational modules via the forwarding circuitry allows efficient usage of limited resources in performing different data reduction operations at different times, and/or in performing multiple data reduction operations in parallel without sharing port bandwidth.

System Description

Figure 1:
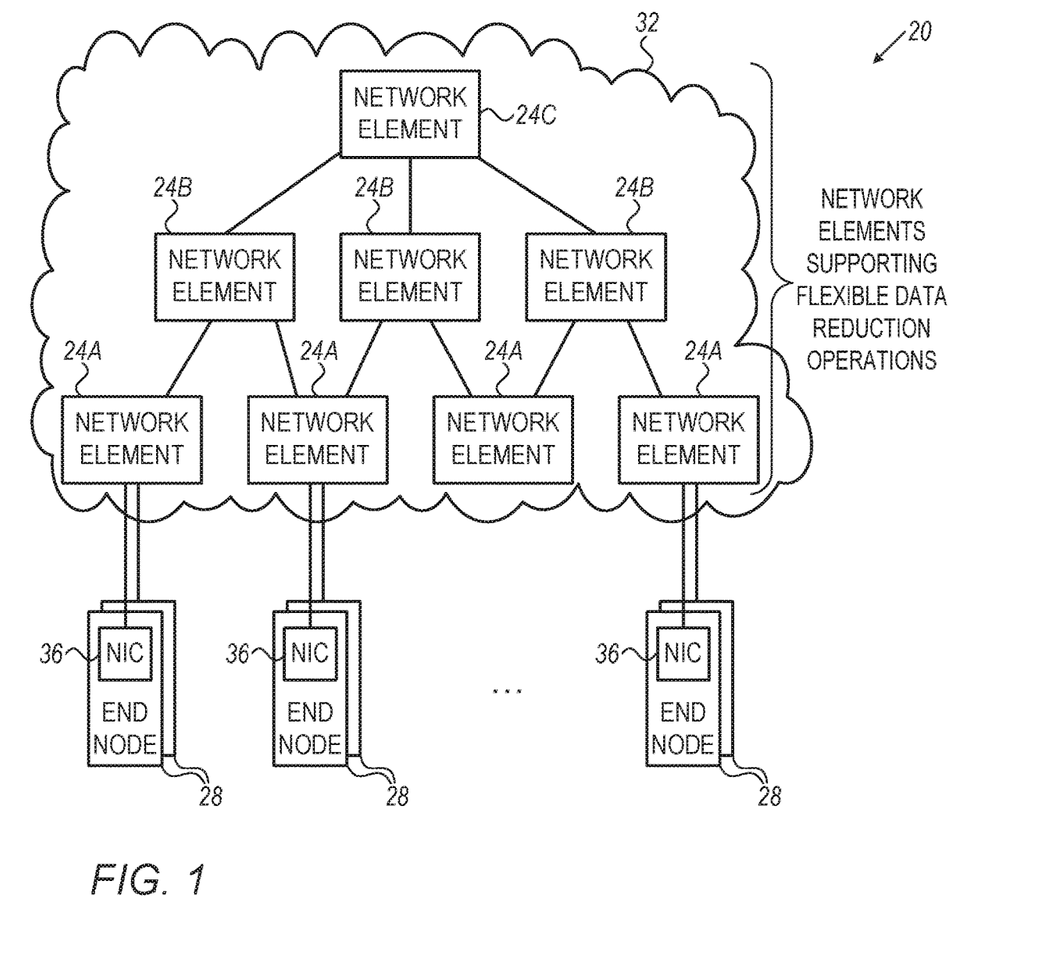
FIG. 1 is a block diagram that schematically illustrates a computing system supporting flexible in-network computing, in accordance with an embodiment that is described herein.

FIG. 1 is a block diagram that schematically illustrates a computing system 20 supporting flexible in-network computing, in accordance with an embodiment that is described herein.

Computing system 20 may be used in various applications such as, High Performance Computing (HPC) clusters, data center applications and Artificial Intelligence (AI), to name a few.

In computing system 20, multiple end nodes 28 communicate with one another over a communication network 32. "End node" 28 is also referred to herein as a "network node." Communication network 32 may comprise any suitable type of a communication network operating using any suitable protocols such as, for example, an Infiniband™ network or an Ethernet network. End node 28 is coupled to the communication network using a Network Interface Controller (NIC) 36. In Infiniband terminology, the network interface is referred to as a Host Channel Adapter (HCA). End node 28 may comprise any suitable processing module such as, for example, a server or a multi-core processing module comprising, for example, one or more Graphics Processing Units (GPUs) or other types of accelerators. End node 28 typically comprises (not shown) multiple processing units such as Central Processing Units (CPUs) and Graphics Processing Units (GPUs), coupled via a suitable link (e.g., a PCIe) to a memory and peripheral devices, e.g., NIC 36.

Communication network 32 comprises multiple network elements 24 interconnected in a multi-level configuration that enables performing complex in-network calculations using data reduction techniques. In the present example, network elements 24 are arranged in a tree configuration having a lower level, a middle level and a top level, comprising network elements 24A, 24B and 24C, respectively. Typically, a network element 24A connects to multiple end nodes 28 using NICs 36.

A practical computing system 20 may comprise several thousands or even tens of thousands of end nodes 28 interconnected using several hundreds or thousands of network elements 24. For example, communication network 32 of computing system 20 may be configured in four-level Fat-Tree topology comprising on the order of 3,500 switches.

In the multi-level tree structure, a network element may connect to child network elements in a lower level or to network nodes, and to a parent network element in a higher level. A network element at the top level is also referred to as a root network element. A subset (or all) of the network elements of a physical tree structure may form a data reduction tree, which is a logical structure typically used for modeling in-network calculations, as will be described below.

In some embodiments, multiple network elements 24 perform a calculation for some or all of network nodes 28. The network elements collectively perform the calculation as modeled using a suitable data reduction tree. In the hierarchical calculation, network elements in lower levels produce partial results that are aggregated by network elements in higher levels of the data reduction tree. A network element serving as the root of the data reduction tree produces the final calculation result (aggregated data), which is typically distributed to one or more network nodes 28. The calculation carried out by a network element 24 for producing a partial result is also referred to as a "data reduction operation."

The data flow from the network nodes toward the root is also referred to as "upstream," and the data reduction tree used in the upstream direction is also referred to as an "upstream data reduction tree." The data flow from the root toward the network nodes is also referred to as "downstream," and the data reduction tree used in the downstream direction is also referred to as a "downstream data reduction tree."

Breaking a calculation over a data stream to a hierarchical in-network calculation by network elements 24 is typically carried out using a suitable data reduction protocol. An example data reduction protocol is the SHArP described in U.S. Pat. No. 10,284,383 cited above.

As will be described below, network elements 24 support flexible usage of ports and computational resources for performing multiple data reduction operations in parallel. This enables flexible and efficient in-network computations in computing system 20.

Network Element Supporting Flexible Data Reduction Operations

Figure 2:
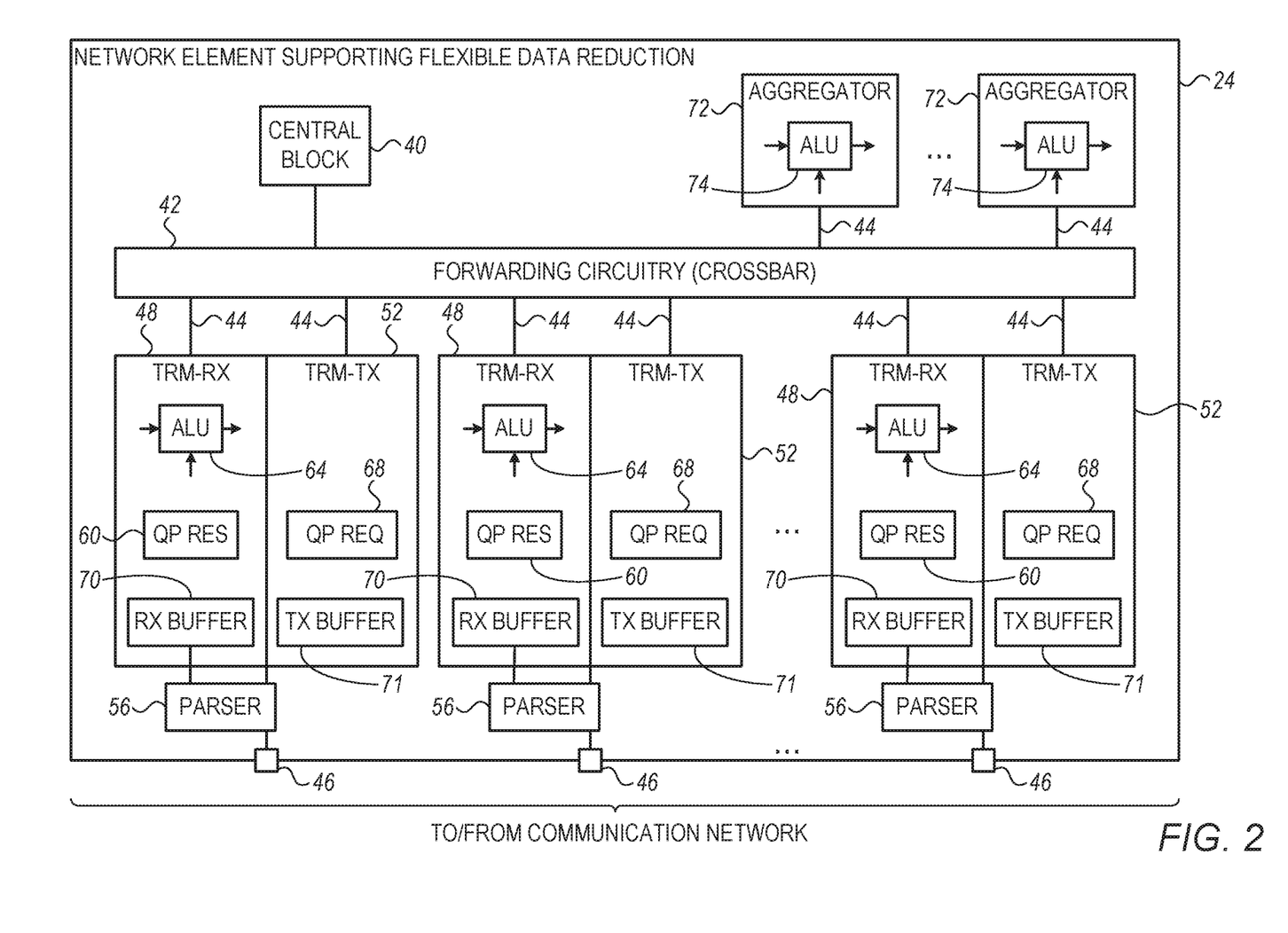
FIG. 2 is a block diagram that schematically illustrates a network element supporting flexible data reduction operations in the computing system of FIG. 1, in accordance with an embodiment that is described herein.

FIG. 2 is a block diagram that schematically illustrates a network element 24 supporting flexible data reduction operations in computing system 20 of FIG. 1, in accordance with an embodiment that is described herein.

Network element 24 may be used, for example, in implementing network elements 24A, 24B and 24C in communication network 32.

Network element 24 comprises a central block 40 that manages the operation of the network element in accordance with the underlying data reduction protocol, e.g., the SHArP mentioned above. The functionality of central block 40 will be described in more detail below.

Network element 24 further comprises configurable forwarding circuitry 42, which is connected using fixed connections 44 to various elements within network element 24. Forwarding circuitry 42 is flexibly configurable to interconnect among the various elements to which it connects. This allows creating various topologies of ports and computational resources for performing data reduction operations. In an embodiment, forwarding circuitry 42 comprises a configurable crossbar switch. The flexibility in interconnections contributes to the ability to support full port bandwidth.

Network element 24 comprises multiple ports 46 for connecting the network element to communication network 32. Each of ports 46 functions both as an input port for receiving packets from the communication network and as an output port for transmitting packets to the communication network. A practical network element 24 may comprise, for example, between 64 and 128 ports 46. Alternatively, a network element having any other suitable number of ports can also be used.

In some embodiments, each port 46 is respectively coupled to a transport-layer reception module 48, denoted "TRM-RX," and to a transport-layer transmission module 52, denoted "TRM-TX." The input part of port 46 is coupled to TRM-RX 48 via a parser 56. TRM-RX 48 comprises a QP responder 60 and a computational module 64, which is also referred to herein as an Arithmetic Logic Unit (ALU). TRM-TX comprises QP requester 68. TRM-RX 48 further comprises a reception buffer 70 denoted RX-BUFFER for storing incoming packets. TRM-TX 52 further comprises a transmission buffer 71 denoted TX-BUFFER for storing outgoing packets.

In some embodiments, central block 40 controls the internal connectivity of forwarding circuitry 42 and the configurations of ALUs 64 so that the ports and the ALUs are interconnected in a topology suitable for performing a requested data reduction operation.

Parser 56 is configured to parse incoming packets, and to identify and send relevant packets to TRM-RX 48.

In some embodiments, parser 56 identifies that a request for applying a data reduction operation is received and notifies the request to central block 40. The request may be indicative of a topology required in the upstream direction, a topology required in the downstream direction or both. Same or different ports may be used in the upstream topology and in the downstream topology, respectively. The data reduction operation itself (e.g., indicative of the function to which ALUs 64 should be configured) may be specified in the request that is indicative of the topology (or topologies) or alternatively, carried in a header of a data message.

The upstream topology supports data reduction operations on data received from certain child network elements via multiple child ports, for producing reduced data destined to a given parent network element via a parent port. The downstream topology specifies a parent port for receiving aggregated data via a given parent port and distributing that aggregated data to certain child ports.

In the upstream direction, the request is indicative of selected child ports, a selected parent port, and computational modules required for performing data reduction operations. The central block derives from the request a topology that interconnects among the selected child ports, selected parent port and ALUs, so as to perform data reduction operations and to forward the resulting reduced data to the selected parent port). As noted above, the actual ALU function may be specified in the request or in a separate data message.

In some embodiments, the selected child ports receive data messages comprising a reduction operation and respective data portions and send the reduction operation to the central block, which sets the computational modules to apply the reduction operation to the data portions.

In the downstream direction, the request is indicative of a given parent port and one or more given child ports, and the central block derives from the request, a topology that interconnects the given parent port to the one or more given child ports for receiving aggregated data from a respective parent network element via the given parent port and distributing the aggregated data via the given child ports to respective network elements or network nodes.

Transport-layer modules TRM-RX 48 and TRM-TX 52 handle reliable connections with other entities via ports 46, such as ports of another network element or a port of a NIC of some network node 28. QP responder 60 in TRM-RX 48 handles reliable data reception via port 46. QP requester 68 in TRM-TX handles reliable data transmission via port 46.

In some embodiments, QP responder 60 receives packets transmitted by a corresponding QP requester, and signals back ACK/NACK notifications. QP requester 68 transmits packets to a corresponding QP responder on the other side of the link and handles re-transmissions as necessary.

Note that since each port 46 has a local QP responder 60 and a local QP requester 68, communication among the network elements (and network nodes) can be carried out at wire speed and with minimal latency. This (and the flexible connectivity via the forwarding circuitry) allow executing multiple data reduction operations using respective disjoint data reduction trees, in parallel, at full port bandwidth.

Network element 24 comprises one or more aggregators 72, each of which comprising an ALU 74, which is identical or similar to ALU 64 of TRM-RX module 48. Aggregator 72 does not receive data directly from any port 46. Instead, aggregator 72 aggregates data output by ALUs 64 of TRM-RXs 48. Aggregator 72 may also aggregate data output by an ALU 74 of another aggregator to create a hierarchical computational topology, in an embodiment.

The functionality of ALU 64 as will described below, also applies similarly to ALU 74. In the present example, ALU 64 (and ALU 74) comprises two inputs and a single output. Let A1, and A2 denote input arguments and let A3 denote a result calculated by the ALU. The ALU typically supports multiple predefined functions to which the ALU may be configured by the central block. When configured to a given function "F( )", the ALU calculates A3 as A3=F(A1, A2). ALUs 64 and 74 support any suitable operation such as, for example, mathematical functions such as integer and floating-point addition, multiplication and division, and logical functions such as logical AND, OR and XOR, bitwise AND, OR and XOR. Other operations supported by ALUs 64 and 74 comprise, for example, min, max, min loc, and max loc. In some embodiments ALUs 64 and 74 support configurable operators.

In some embodiments, data received via port 46 (from a child network element or from a network node) is provided to one input of ALU 64. ALU 64 may be configured to a Null function, in which case the other input of the ALU is ignored and the data received from the port is output by ALU 64 with no modification. Alternatively, ALU 64 receives on its other input (via the forwarding circuitry) data calculated by another ALU 64, and applies the function F( ) to the data received on both inputs. ALU 74 typically receives, via the forwarding circuitry, data output by two ALUs 64. In performing a data reduction operation, the participating ALUs 64 and ALU 74 are configured by the central block to a common function F( ). Alternatively, at least some of the ALUs (64, 74 or both) assigned to a given data reduction operation may be configured to apply different functions.

The output of ALU 64 may be routed via the forwarding circuitry as input to another ALU 64 (or ALU 74) as described above. Alternatively, the output of ALU 64 may be routed via the forwarding circuitry to a QP requester of the parent port for transmission to a parent network element. In a root network element, the output of the last ALU 64 that concludes the calculation specified by the underlying reduction tree may be routed to the QP requesters of the child ports participating in the downstream tree.

The configurations of computing system 20 and network element 24 in FIGS. 1 and 2, as well as network element 24 in FIGS. 5 and 6 below, are given by way of example, and other suitable computing system and network element configurations can also be used.

Some elements of network element 24, such as central block 40, forward circuitry 42 (possibly implemented as separate upstream crossbar 82 and downstream crossbar 84, in FIGS. 5 and 6 below), ALU 64, ALU 74, parser 56, QP responder 60, QP requester 68, reception buffer 70 and transmission buffer 71 may be implemented in hardware, e.g., in one or more Application-Specific Integrated Circuits (ASICs) or Field-Programmable Gate Arrays (FPGAs). Additionally or alternatively, some elements of the network element can be implemented using software, or using a combination of hardware and software elements.

Elements that are not necessary for understanding the principles of the present application, such as various interfaces, addressing circuits, timing and sequencing circuits and debugging circuits, have been omitted from FIGS. 1, 2, 5 and 6 for clarity.

In some embodiments, some of the functions of central block 40 may be carried out by a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Example Computational Configurations within Network Element

Figure 3A:
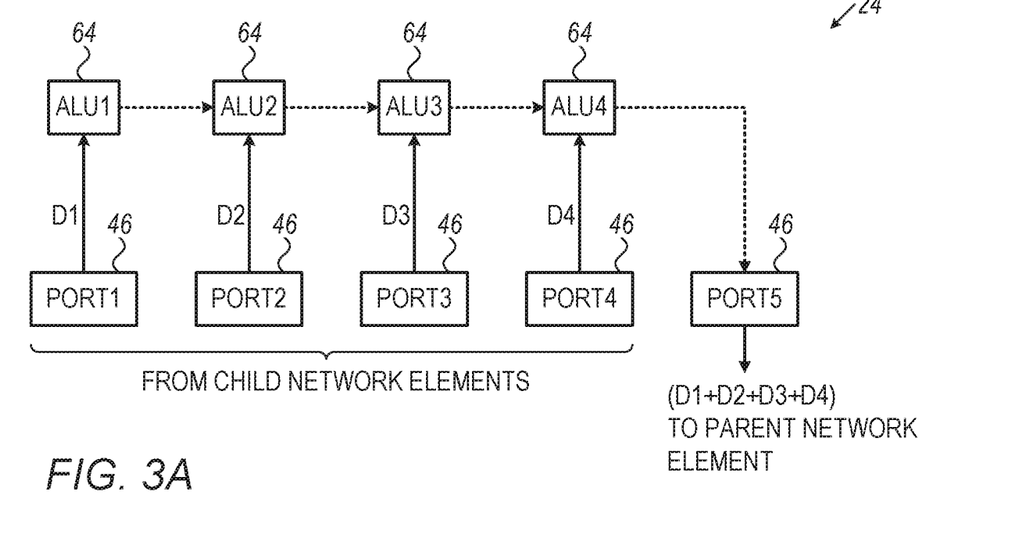
FIGS. 3A and 3B are diagrams that schematically illustrate example data reduction schemes within a network element, in accordance with embodiments that are described herein.
Figure 3B:
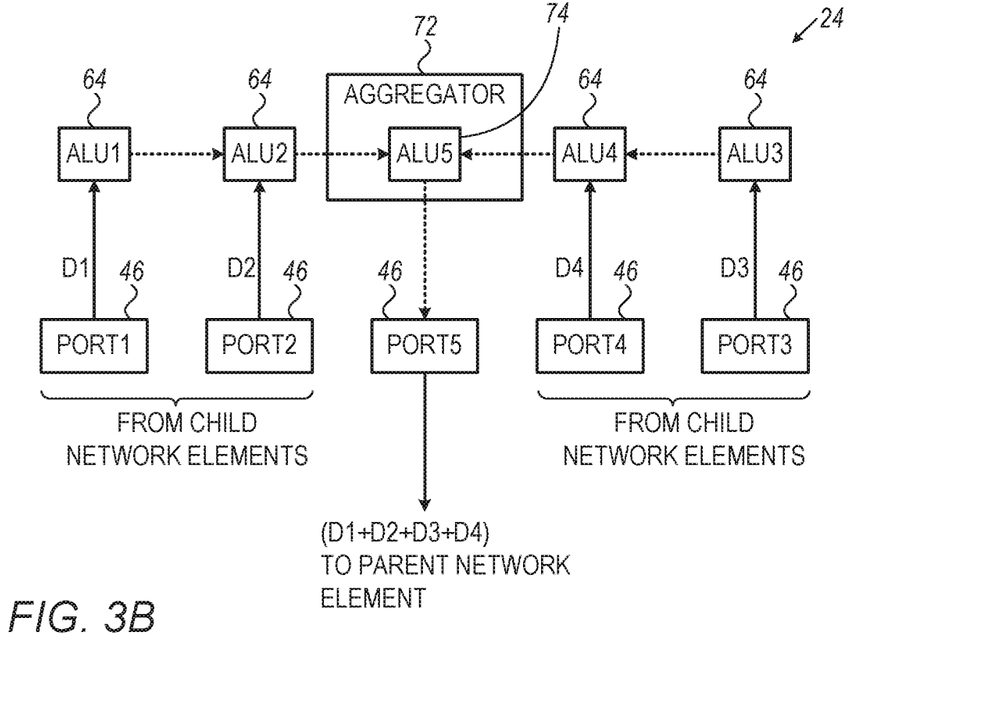

FIGS. 3A and 3B are diagrams that schematically illustrate example data reduction schemes within network element 24, in accordance with embodiments that are described herein.

In FIG. 3A, ALUs 64 denoted ALU1 . . . ALU4 are connected serially in a daisy-chain topology. The connections (in dotted lines) between successive ALUs 64 in the chain are implemented within forwarding circuitry 42 under the control of central block 40.

ALU1 . . . ALU4 receive data denoted D1 . . . D4 from child network elements (or from network nodes 28) via respective ports denoted PORT1 . . . PORT4 and are collectively configured to perform a data reduction operation. In the present example, the data reduction operation calculates the sum (D1+D2+D3+D4). To this end, ALU1 is configured to transfer D1 to the output of ALU1 and each of ALU2 . . . ALU4 calculates a sum function between its inputs. The calculation is carried out accumulatively as follows: ALU2 outputs the sum (D1+D2), ALU3 outputs the sum [(D1+D2)+D3], and ALU4 outputs the final sum {[(D1+D2)+D3]+D4}. The data reduction result (D1+D2+D3+D4) output by ALU4 is routed via forwarding circuitry 42 to a parent network element via PORT5.

In FIG. 3B, ALUs 64 denoted ALU1 . . . ALU4 and ALU 74 denoted ALU5 are connected in an aggregated topology. The connections (in dotted lines) from each ALU output to the input of the next ALU are implemented within forwarding circuitry 42 under the control of central block 40.

ALU1 . . . ALU4 receive data denoted D1 . . . D4 from child network elements via respective ports denoted PORT1 . . . PORT4 and together with ALU5 are collectively configured to perform a data reduction operation, in the present example calculating the sum (D1+D2+D3+D4). The topology in FIG. 3B comprises a first chain comprising ALU1 and ALU2 and a second chain comprising ALU3 and ALU4. The forwarding circuitry connects the outputs of ALU2 and of ALU4 to the inputs of ALU5. ALU1 and ALU3 are configured to transfer their input data (D1 and D3) to their respective outputs, and each of ALU2, ALU4 and ALU5 calculates the sum of its inputs.

The chain comprising ALU1 and ALU2 calculates a partial sum (D1+D2) and the chain comprising ALU3 and ALU4 calculates a partial sum (D3+D4). ALU 5 calculates the aggregated result [(D1+D2)+(D3+D4)], which the forwarding circuitry routes to port5 for transmission to a parent network element.

In the example of FIGS. 3A and 3B, two different topologies in which the ports and ALUs are interconnected are used in calculating the same sum (D1+D2+D3+D4). In FIG. 3A the calculation is accumulated over a chain of four ALUs. In FIG. 3B the calculation aggregates two short chains, and therefore the calculation latency in FIG. 3B is shorter than in FIG. 3A.

The data reduction topologies in FIGS. 3A and 3B are given by way of example, and other suitable topologies can also be used. For example, since forwarding circuitry 42 is flexibly configurable, complex topologies with multiple aggregation levels using multiple aggregators 72 can be used. Moreover, different groups of ports and ALUs may be allocated by central block 40 to perform multiple respective data reduction operations in parallel. This allows computing system 20 to perform multiple high-bandwidth in-network computations in parallel, using disjoint data reduction trees having separate respective groups of ports and ALUs within each network element.

A Method for Data Reduction

Figure 4:
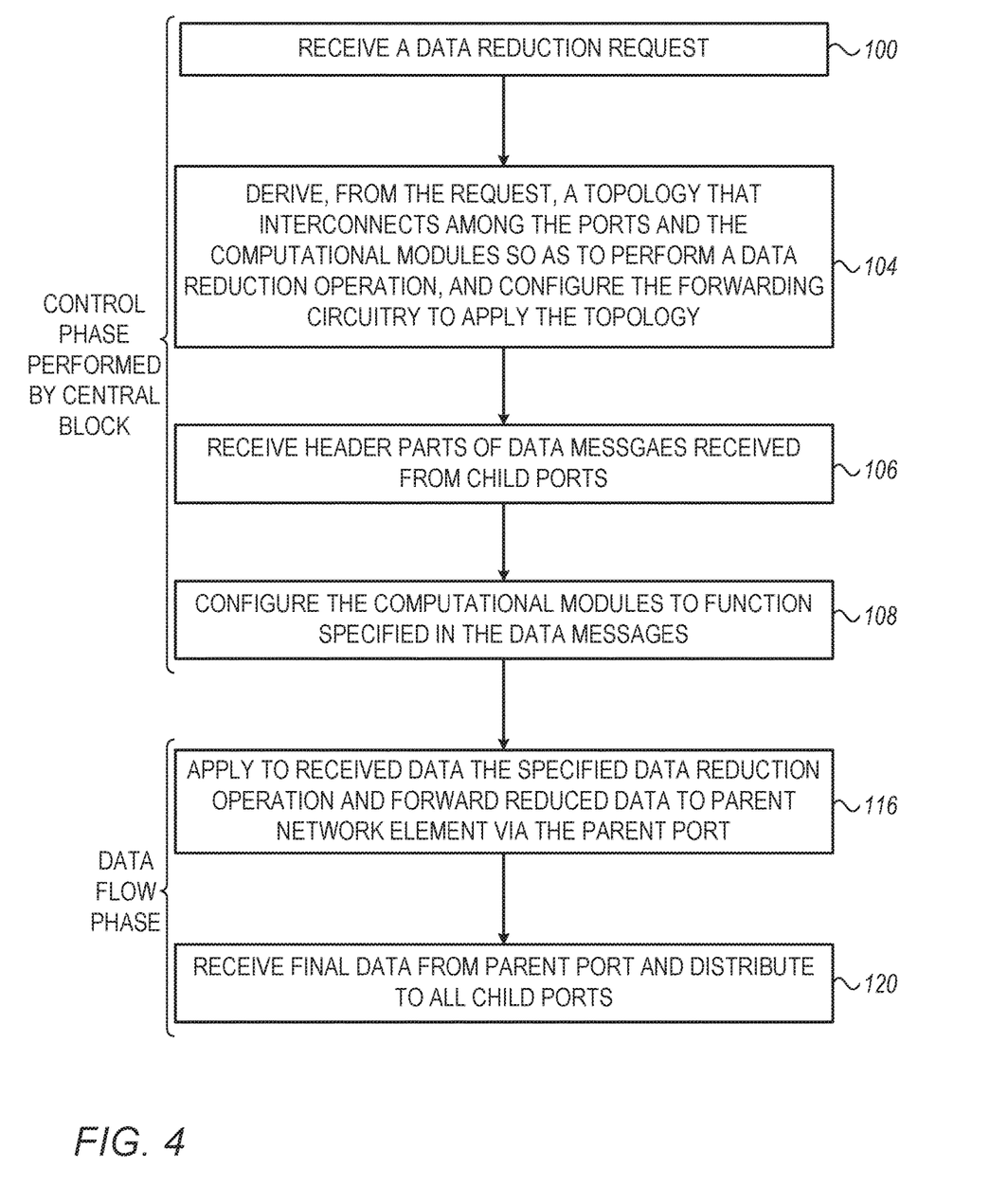
FIG. 4 is a flow chart that schematically illustrates a method for performing a data reduction operation in a network element, in accordance with an embodiment that is described herein.

FIG. 4 is a flow chart that schematically illustrates a method for performing a data reduction operation in network element 24, in accordance with an embodiment that is described herein.

The method will be described for the upstream and downstream directions.

The method of FIG. 4 begins with central block 40 receiving a data reduction request, in accordance with a data reduction protocol, at a request reception step 100. The central block may receive the data reduction request from one or more child network elements or using some out-of-band link. The data reduction request comprises information regarding a data reduction tree to be implemented by the network element, typically as part of executing a calculation by computing system 20 using a suitable data reduction tree.

The request is indicative of selected child ports, a selected parent port and computational modules required for applying data reduction operations. The same data reduction request supports multiple different reduction operations on data that will be received from certain child network elements via the selected child ports, for producing reduced data destined to a parent network element via the selected parent port. Performing the data reduction operation typically requires data manipulation using ALUs 64, possibly with one or more ALUs 74 of aggregators 72. In the present example, the same selected child ports and selected parent port are used in both the upstream and downstream directions.

At a topology derivation step 104, central block 40 derives, from the data reduction request, a topology that interconnects among the selected child ports, the selected parent port, and computational modules (ALUs 64, 74 or both) so as to perform data reduction operations and to forward the reduced data for transmission to the selected parent port. Further at step 104, the central block configures forwarding circuitry 42 to apply the derived topology.

When the network element comprises a root network element, the topology routes the aggregated data calculated by the last ALU to the QP requesters of relevant the child ports that distribute the aggregated data in accordance with a corresponding downstream tree.

At a data message reception step 106, the central block receives header parts of data messages received from child network elements or network nodes, via the selected child ports. Each data message comprises multiple packets. The data message specifies, e.g., in the header part (e.g., in the first packet), the data reduction operation to be performed using the already configured topology. In some embodiments, parser 56 sends the header part of the data message to the control block and forwards the payload data of the data message to the relevant computational module.

At a computational module configuration step 108, central block 40 configures the computational modules that participate in the data reduction operations to a function specified in the header of the data message(s). Step 108 is relevant to the upstream direction and may be skipped in the downstream direction.

At an upstream data flow step 116, the computational modules assigned based on the data message apply to the data payloads received in the data messages the specified data reduction operation, and the resulting reduced data is sent to the parent network element via the selected parent port.

When the network element comprises a root network element, the resulting reduced data comprises the aggregated data, which is sent via the forwarding circuitry to all the selected child ports. At a downstream data flow step 120, the network element receives aggregated data from the selected parent port, and distributes the aggregated data, via the forwarding circuitry, to the selected child ports. Following step 120 the method terminates.

At steps 116 and 120 above each QP requester of the parent port and child ports is responsible for sending the messages on a reliable connection or on the transport layer.

In some embodiments, the method of FIG. 4 may be executed similarly assuming different upstream and downstream data reduction trees. In these embodiments, different sets of selected child ports and a parent port may be used for the respective upstream and downstream directions.

Upstream and Downstream Example Flows

Figure 5:
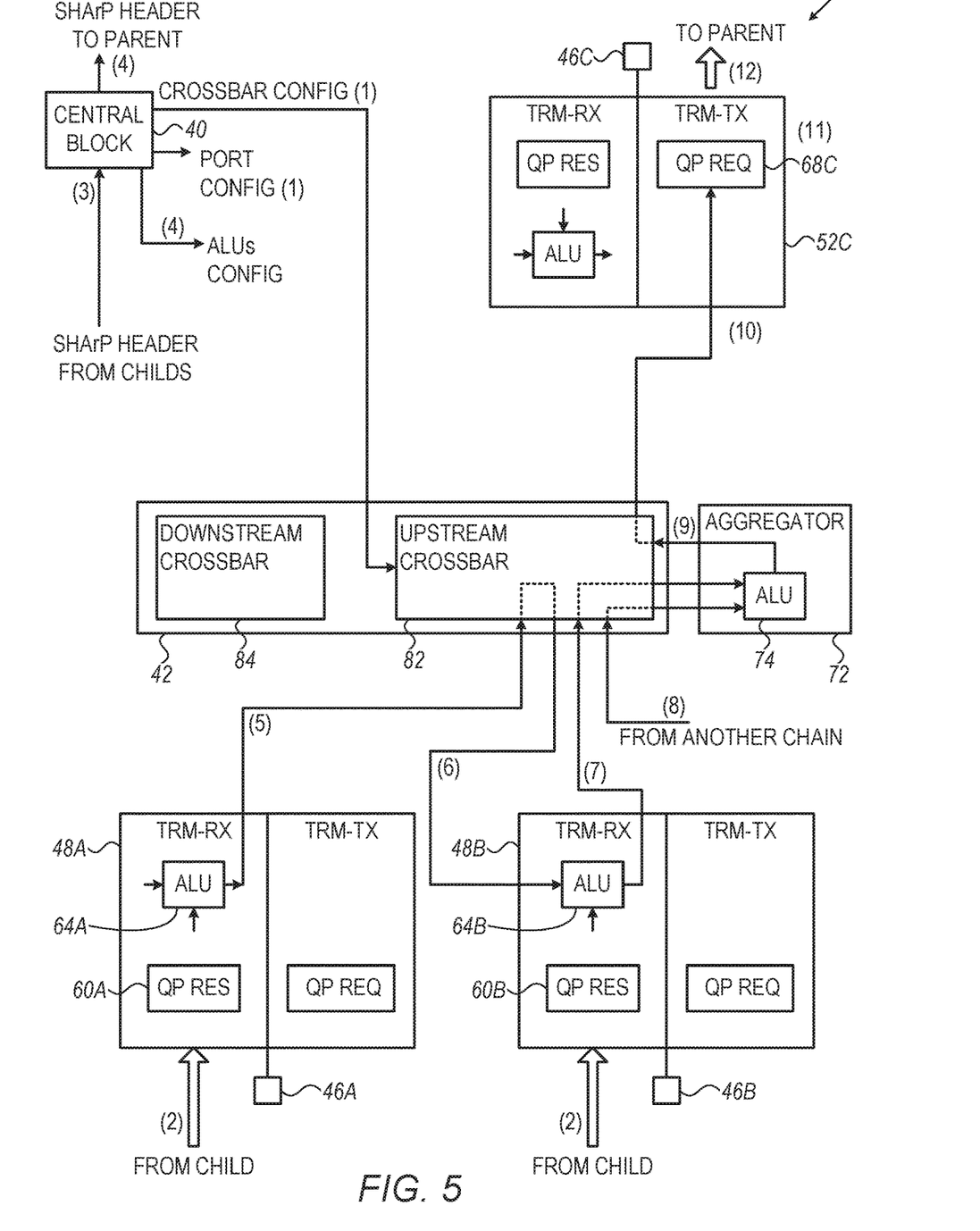
FIGS. 5 and 6 are diagrams that schematically illustrates upstream and downstream data reduction flows within a network element, in accordance embodiments that is described herein.
Figure 6:
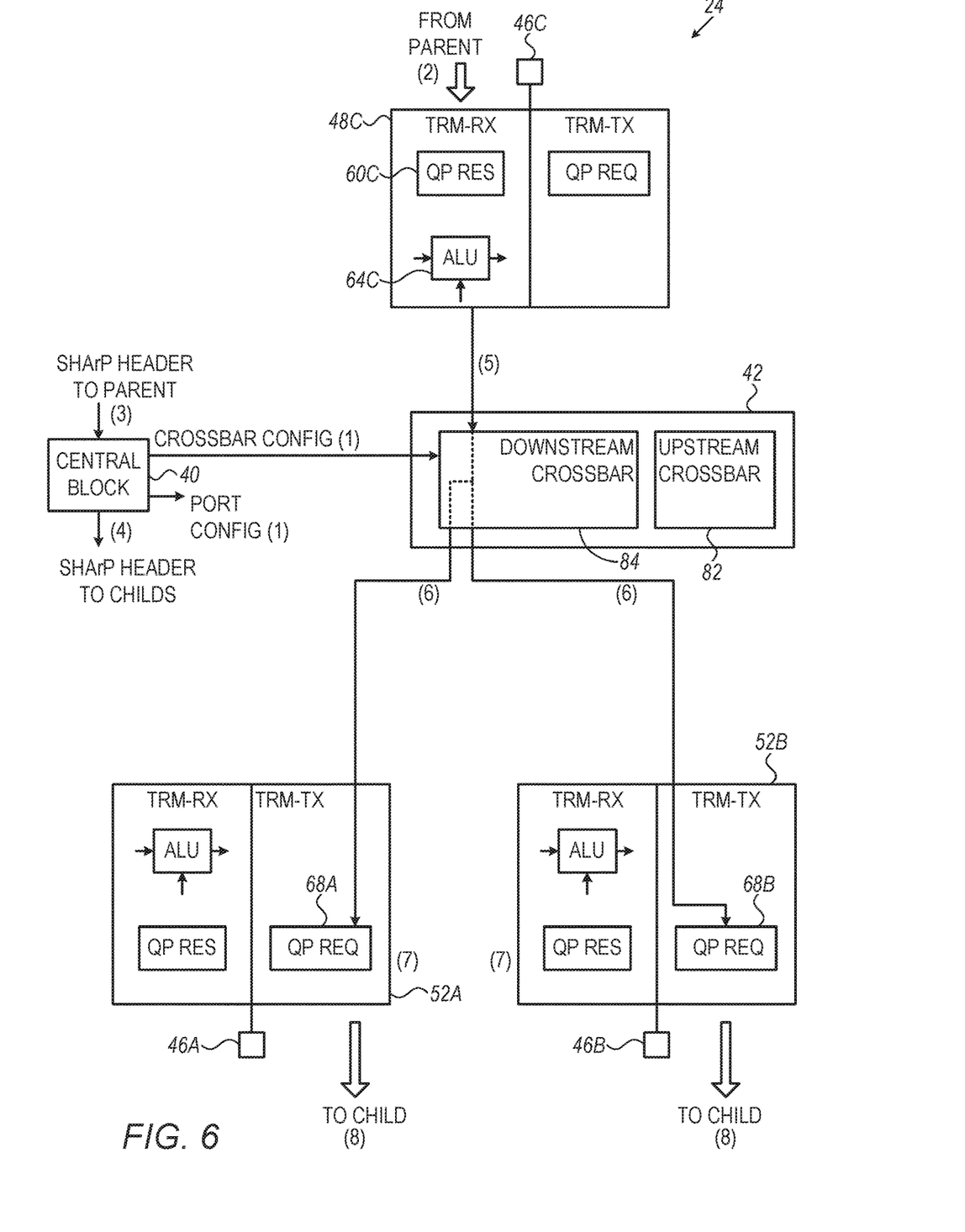

FIGS. 5 and 6 are diagrams that schematically illustrate upstream and downstream data reduction flows within network element 24, in accordance embodiments that is described herein.

In FIGS. 5 and 6, forwarding circuitry 42 comprises upstream forwarding circuitry 82 and downstream forwarding circuitry 84, which may be implemented as separate crossbar elements.

In describing FIGS. 5 and 6, it is assumed that the network element resides at a level lower than the root level. It is further assumed that forwarding circuitry 42 comprises separate upstream crossbar 82 and downstream crossbar 84, and that the same data reduction tree is used for both the upstream and downstream directions.

The flow steps in FIGS. 5 and 6 are numbered in the diagrams and will be described below.

In the upstream direction, depicted in FIG. 5, at step (1), central block 40 configures upstream crossbar 82 to connect among ports 46 and computational modules (ALUs 64 and ALU 74 of aggregator 72) in accordance with an upstream data reduction tree. In the present example, the central block configures ports 46A and 46B for receiving data for reduction from child network elements and configures port 46C for transmitting the calculated reduced data to a parent network element. Central block 40 additionally configures the upstream crossbar to connect ALUs 64A and 64B serially in a chain configuration whose output connects to an input of ALU 74. The other input of ALU 74 connects via the upstream crossbar to another chain of ALUs 64 (not shown).

At step (2), QP responders 60A and 60B of respective ports 46A and 46B receive packets of data messages from the child network elements. In the data messages, each packet comprises a transport layer header and a payload, wherein the first packet of the data message additionally comprises a SHArP header. The QP responder of each port handles the transport layer, and after sending the SHArP header to the central block forwards the payloads of the packets to ALU 64 of that port. At step (3) TRM-RX modules 48 of the child ports forward the SHArP header of the first packet to the central block, which at step (4) prepares a SHArP header for transmitting the reduced data. Further at step (4) the central block sets ALUs 64 and 74 to apply a function specified in the first packet.

At steps (5) and (6), ALUs 64A and 64B perform data reduction to the payload received in each data message via child ports 46A and 46B. At steps (7) and (8) ALU 74 of aggregator 72 receives partially reduced data from ALU 64B and from the other chain, and at step (9) ALU 74 calculates the overall reduced data. At step (10), the reduced data is forwarded to port 46C for transmission to the parent network element.

At step (11) QP requestor 68C packetizes a reduced data message that contains the reduced data and the SHArP header of step (4) and rebuilds the transport layer by attaching to each packet of the reduced data message a transport layer header. QP requester 68C handles reliable transport layer packet transmission, including retransmissions. In some embodiments, the QP requester uses some storage space of a local buffer (e.g., transmission buffer 71) of the port as a retry buffer for retransmission. In some embodiments, at step (12), the network element applies a suitable scheduling scheme (not shown) for packet transmission via port 46C including, for example, bandwidth allocation and prioritization using Virtual Lane (VL) management.

In the downstream direction, depicted in FIG. 6, at step (1), central block 40 configures downstream crossbar 84 to connect among ports 46 for distributing aggregated data received from a parent network element to multiple child network elements, in accordance with a downstream data reduction tree. In the present example, the central block configures parent port 46C for receiving aggregated data from the parent network element, and configures child ports 46A and 46B for transmitting the aggregated data to respective child network elements or end nodes. Central block 40 additionally configures the downstream crossbar to forward the aggregated data to both child ports 46A and 46B in parallel.

At step (2), QP responder 60C of port 46C receives packets carrying aggregated data, in an aggregated data message, from the parent network element. In the aggregated data message, each packet comprises a transport layer header and a payload, and the first packet additionally comprises a SHArP header. QP responder 60C handles the transport layer, and after sending the SHArP header to the central block forwards the payloads of the packets to the downstream crossbar. In some embodiments, the payloads of the packets are forwarded via ALU 64C that is configured by the central block to a Null function, so that the packet payload is transferred by the ALU with no modification. In alternative embodiments, ALU 64C is bypassed, and the packet payload is forwarded directly to the downstream crossbar, as will be described at step (5) below.

At step (3) TRM-RX 48C of port 46C forwards the SHArP header of the received packet to central block 40, and at step (4) the central block prepares a SHArP header for transmitting with the aggregated data to the child network elements.

At steps (5) and (6) the downstream crossbar receives the payload of the aggregated data message and forwards the payload to both child ports 46A and 46B in parallel.

At step (7), each of QP requesters 68A and 68B packetizes an aggregated data message that contains the aggregated data and the SHArP header of step (4) and rebuilds the transport layer by attaching to each packet of the aggregated message a transport layer header. QP requesters 68A and 68B handle transport layer packet transmission, including retransmissions. As noted above, in some embodiments, the QP requester may use storage space of a local buffer (e.g., transmission buffer 71) of the port as a retry buffer for retransmission. In some embodiments, at step (8), the network element applies a suitable scheduling scheme (not shown) for packet transmission to ports 46A and 46B including, for example, bandwidth allocation and prioritization using Virtual Lane (VL) management.

The embodiments described above are given by way of example, and other suitable embodiments can also be used. For example, in the embodiments of FIGS. 5 and 6, upstream and downstream directions are described separately. In some embodiments, same or different respective topologies for the upstream and downstream directions may be applied in parallel using a dedicated crossbar for each direction, e.g., for calculating a reduced data and distributing the resulting aggregated data.

Although the embodiments described herein mainly address data reduction operations such as "all reduce" and "reduce" operations, the methods and systems described herein can also be used in other applications, such as in performing, for example, "reliable multicast," "reliable broadcast," "all gather" and "gather" operations.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network element, comprising:
   a plurality of ports, including multiple child ports coupled to respective child network elements or network nodes and one or more parent ports coupled to respective parent network elements, the plurality of ports being configured to connect to a communication network;
   multiple computational modules, configured to collectively perform a data reduction operation in accordance with a data reduction protocol, wherein the data reduction operation calculates, based on data received via the multiple child ports, a partial result to be sent via the parent port for aggregation with other partial results produced by one or more other network elements;
   configurable forwarding circuitry, configured to interconnect within the network element among the multiple child ports, the parent port, and the multiple computational modules; and
   a central block, configured to:
   receive a request indicative of selected child ports, a selected parent port, and computational modules required for performing data reduction operations on data received from the child network elements or network nodes via the selected child ports, for producing reduced data destined to a parent network element via the selected parent port;

derive, from the request, a topology that interconnects within the network element among the selected child ports, the selected parent port and the computational modules so as to perform the data reduction operations and to forward the respective reduced data for transmission to the selected parent port; and configure the forwarding circuitry to apply the topology.

2. The network element according to claim 1, wherein the selected child ports are configured to receive data messages comprising a reduction operation and respective data portions, and to send the reduction operation to the central block, and wherein the central block is configured to set the computational modules to apply the reduction operation to the data portions.

3. The network element according to claim 1, wherein the central block is configured to derive the topology to interconnect computational modules that receive data for reduction via the selected child ports, in a chain configuration.

4. The network element according to claim 1, wherein the central block is configured to derive the topology to interconnect outputs of two computational modules that receive data for reduction via the selected child ports as inputs to an aggregator computational module.

5. The network element according to claim 1, wherein the selected parent port and each of the selected child ports comprise a Queue Pair (QP) responder and a QP requester, configured to respectively handle reliable transport layer reception and transmission of packets.

6. The network element according to claim 1, wherein the central block is configured to:

receive a first request indicative of first child ports, a first parent port and first computational modules required to perform first data reduction operations on data received via the first child ports and destined to the first parent port, and further receive a second request indicative of second child ports, a second parent port, and second computational modules required to perform second data reduction operations on data received via the second child ports and destined to the second parent port;

derive, from the first request a first topology for performing the first data reduction operations and derive from the second request a second topology for performing the second data reduction operations; and configure the forwarding circuitry to apply both the first topology and the second topology so as to support performing the first data reduction operations and the second data reduction operations in parallel.

7. The network element according to claim 1, wherein the request is indicative of the network element serving as a root network element, and wherein the central block is configured to derive from the request a topology that interconnects among the selected child ports and the computational modules so as to perform the data reduction operations for producing aggregated data, and to route the aggregated data to one or more child ports.

8. The network element according to claim 1, wherein the request or a separately received request is indicative of a given parent port and one or more given child ports, and wherein the central block is configured to derive from the request, a topology that interconnects the given parent port to the one or more given child ports for receiving aggregated data from a respective parent network element via the given parent port, and to distribute the aggregated data via the given child ports to respective network elements or network nodes.

9. The network element according to claim 1, wherein the forwarding circuitry comprises upstream forwarding circuitry and downstream forwarding circuitry, and wherein the central block is configured to apply, in parallel, an upstream topology to the upstream forwarding circuitry for applying the data reduction operations, and to apply a downstream topology to the downstream forwarding circuitry for distributing aggregated data produced by a root network element toward one or more network nodes.

10. A method, comprising:

in a network element comprising (i) a plurality of ports that connect to a communication network, including multiple child ports coupled to respective child network elements or network nodes and one or more parent ports coupled to respective parent network elements, (ii) multiple computational modules that collectively perform a data reduction operation in accordance with a data reduction protocol, wherein the data reduction operation calculates, based on data received via the multiple child ports, a partial result to be sent via the parent port for aggregation with other partial results produced by one or more other network elements, and (iii) configurable forwarding circuitry that interconnects within the network element among the multiple child ports, the parent port, and the multiple computational modules, receiving by a central block of the network element a request indicative of selected child ports, a selected parent port, and computational modules required for performing data reduction operations on data received via the selected child ports, for producing reduced data destined to a parent network element via the selected parent port;

deriving, from the request, a topology that interconnects within the network element among the selected child ports, the selected parent port and the computational modules so as to perform data reduction operations, and to forwarding the reduced data for transmission to the selected parent port; and configuring the forwarding circuitry to apply the topology.

11. The method according to claim 10, and comprising receiving via the selected child ports data messages comprising a reduction operation and respective data portions, sending the reduction operation to the central block, and setting the computational modules, by the central block, to apply the reduction operation to the data portions.

12. The method according to claim 10, wherein deriving the topology comprises deriving the topology to interconnect computational modules that receive data for reduction via the selected child ports, in a chain configuration.

13. The method according to claim 10, wherein deriving the topology comprises deriving the topology to interconnect outputs of two computational modules that receive data for reduction via the selected child ports as inputs to an aggregator computational module.

14. The method according to claim 10, wherein the selected parent port and each of the selected child ports comprise a Queue Pair (QP) responder and a QP requester, and comprising respectively handling, using the QP requester and the QP responder reliable transport layer reception and transmission of packets.

15. The method according to claim 10, and comprising:
receiving a first request indicative of first child ports, a first parent port and first computational modules required to perform first data reduction operations on data received via the first child ports and destined to the first parent port, and further receiving a second request indicative of second child ports, a second parent port, and second computational modules required to perform second data reduction operations on data received via the second child ports and destined to the second parent port;
deriving, from the first request a first topology for performing the first data reduction operations and deriving from the second request a second topology for performing the second data reduction operations; and
configuring the forwarding circuitry to apply both the first topology and the second topology so as to support performing the first data reduction operations and the second data reduction operations in parallel.

16. The method according to claim 10, wherein the request is indicative of the network element serving as a root network element, and comprising deriving from the request a topology that interconnects among the selected child ports and the computational modules so as to perform the data reduction operations for producing aggregated data, and routing the aggregated data to one or more child ports.

17. The method according to claim 10, wherein the request or a separately received request is indicative of a given parent port and one or more given child ports, and comprising deriving from the request, a topology that interconnects the given parent port to the one or more given child ports for receiving aggregated data from a respective parent network element via the given parent port, and distributing the aggregated data via the given child ports to respective network elements or network nodes.

18. The method according to claim 10, wherein the forwarding circuitry comprises upstream forwarding circuitry and downstream forwarding circuitry, and comprising applying, in parallel, an upstream topology to the upstream forwarding circuitry for applying the data reduction operations, and applying a downstream topology to the downstream forwarding circuitry for distributing aggregated data produced by a root network element toward one or more network nodes.

* * * * *